United States Patent Office 3,271,328
Patented Sept. 6, 1966

3,271,328
POLYMERIZATION OF EPOXIDES IN THE PRESENCE OF ALUMINUM ALKYLATE AS CATALYST
Fred N. Hill, South Charleston, W. Va., assignor to Union Carbide Corporation, a corporation of New York
No Drawing. Filed July 30, 1957, Ser. No. 675,023
2 Claims. (Cl. 260—2)

The present invention relates to the polymerization of lower olefin oxides and in particular to the polymerization of ethylene oxide. More particularly, the present invention relates to the polymerization of lower olefin oxides to high molecular weight products, that is, to products such as have a reduced viscosity of at least one, by contacting the olefin oxide with an aluminum alkylate (alkoxide). As is known in the polymer arts, reduced viscosity is a measure of molecular weight and is obtained by dividing the specific viscosity by the concentration of the polymer in the solution, the concentration being measured in grams of polymer per 100 ml. of solvent. The specific viscosity is obtained by dividing the difference between the viscosity of the solution and the viscosity of the pure solvent by the viscosity of the solvent. The reduced viscosities appearing herein were measured at a concentration of 0.2 gram of polymer in 100 ml. of solvent at 30° C. The reduced viscosities of the ethylene oxide polymers were measured in acetonitrile.

According to the present process, a lower olefin oxide such as ethylene oxide, propylene oxide, 1,2-epoxybutane, or 2,3-epoxybutane is contacted with a catalytic quantity of an aluminum alkylate. The aluminum alkoxide catalyst is preferably an aluminum lower-alkylate such as aluminum methylate, aluminum ethylate, aluminum propylate, aluminum isopropylate, or aluminum butylate.

In the practice of the present method the lower olefin oxide, particularly, ethylene oxide, is contacted with a catalytic quantity of one of the aluminum alkylates described at a temperature in the range from room temperature (about 25° C.) to 150° C. and preferably at a temperature in the range from 80° C. to 120° C.

The concentration of catalyst is not critical. In practice I use at least about 0.01 part by weight of catalyst per each 100 parts by weight of the epoxide. Greater or smaller concentration of catalyst can be used as desired and will vary with the catalyst of choice, the reaction temperature chosen, and the rate of reaction desired. I prefer to use a concentration of catalyst in the range of 0.01 to 1.0 part by weight of the alkylate per each 100 parts by weight of lower olefin oxide.

In polymerizing the epoxides certain impurities which may be present are to be avoided. These impurities are carbon dioxide, water, aldehydes, and oxygen. When polymerizing ethylene oxide, ethylene oxide of satisfactory purity can be obtained on a laboratory scale by distilling the ethylene oxide through drying agents, such as Drierite,[1] and agents for removing carbon dioxide such as Ascarite.[2] Inasmuch as the polymerization is a liquid phase reaction, a pressure above atmospheric is employed to maintain the liquid phase. However, in the usual case external pressure is not necessary and it is necessary only to employ reaction equipment capable of withstanding the pressure of the epoxide at the reaction temperature, that is, the autogenous pressure. The present method can be employed as a bulk polymerization method, or if desired an inert diluent can be used. Satisfactory diluents are those such as benzene, toluene, the dimethyl and diethyl ethers of ethylene glycol, and the normally liquid saturated hydrocarbons such as pentane, hexane, heptane, various hydrocarbon fractions from petroleum, cyclohexane and decahydronaphthalene.

The present process is particularly well-adapted to the production of ethylene oxide polymers with reduced viscosities in the range from one to about ten.

The following examples are illustrative.

*Example I*

A nine inch Pyrex tube, 22 mm. in diameter, sealed at one end and fitted at the other with a three inch piece of 8 mm. Pyrex tubing, was used to make the reaction vessel. To the tube was charged 30 grams of ethylene oxide and 0.009 gram of aluminum isopropylate. Prior to being charged with the reaction mixture the tube was cleaned, dried and flushed with dry nitrogen. The tube was filled in a "dry box" containing a nitrogen atmosphere. After the tube was filled, it was closed with a rubber cap, cooled in a Dry-Ice acetone bath and sealed. The tube was then placed in a water bath maintained at 100° C. and gently rocked for 70 hours. At the end of that time the tube was cracked open and the product, 15 grams of a polymer with a reduced viscosity of 3.7, removed.

*Example II*

The procedure of Example I was repeated using 0.02 gram of catalyst and maintaining the temperature at 100° C. for 47 hours. The poly(ethylene oxide) recovered had a reduced viscosity of 6.9.

*Example III*

Thirty grams of ethylene oxide and 0.15 gram of aluminum ethylate were sealed in a tube according to the procedure of Example I. The tube was allowed to stand at room temperature for 600 hours. Thirty grams of polymer having a reduced viscosity of 1.5 was obtained.

What is claimed is:
1. A process for the production of a solid polymer of ethylene oxide which comprises polymerizing ethylene oxide at about 25° C. to 150° C. in the presence of a catalytic quantity of aluminum $C_1$–$C_4$ alkylate.
2. A process for the production of a solid polymer of ethylene oxide which comprises polymerizing ethylene oxide at about 25° C. to 150° C. in the presence of aluminum triisopropylate as the catalyst therefor.

References Cited by the Examiner
UNITED STATES PATENTS

| | | |
|---|---|---|
| 1,976,678 | 10/1934 | Wittmer. |
| 2,706,189 | 4/1955 | Pruitt et al. |
| 2,767,158 | 10/1956 | Schlenker et al. _____ 260—47 |
| 2,870,099 | 1/1959 | Barrows et al. _____ 260—2 |

WILLIAM H. SHORT, *Primary Examiner.*

MILTON STERMAN, PHILLIP E. MANGAN, HAROLD N. BURSTEIN, *Examiners.*

T. D. KERWIN, G. A. DAPALOI, A. LIBERMAN, S. N. RICE, T. PERTILLA, *Assistant Examiners.*

[1] W. A. Hammond Drierite Co. trademark for anhydrous calcium sulfate.
[2] Arthur H. Thomas Co. trademark for sodium hydroxide-asbestos absorbent for carbon dioxide.